(12) United States Patent
Steert et al.

(10) Patent No.: US 10,570,297 B2
(45) Date of Patent: Feb. 25, 2020

(54) UV CURABLE COLOURLESS INKJET LIQUIDS

(71) Applicant: AGFA NV, Mortsel (BE)

(72) Inventors: Koen Steert, Mortsel (BE); Bart Waumans, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/559,174

(22) PCT Filed: Feb. 10, 2016

(86) PCT No.: PCT/EP2016/052773
§ 371 (c)(1),
(2) Date: Sep. 18, 2017

(87) PCT Pub. No.: WO2016/150611
PCT Pub. Date: Sep. 29, 2016

(65) Prior Publication Data
US 2018/0079919 A1    Mar. 22, 2018

(30) Foreign Application Priority Data

Mar. 20, 2015   (EP) .................................... 15160113

(51) Int. Cl.
| | | |
|---|---|---|
| *C09D 11/101* | (2014.01) | |
| *C09D 11/30* | (2014.01) | |
| *B41M 7/00* | (2006.01) | |
| *B41M 5/50* | (2006.01) | |
| *C09D 11/32* | (2014.01) | |
| *B41J 2/01* | (2006.01) | |

(52) U.S. Cl.
CPC ............... *C09D 11/101* (2013.01); *B41J 2/01* (2013.01); *B41M 5/502* (2013.01); *B41M 5/508* (2013.01); *B41M 7/0045* (2013.01); *C09D 11/30* (2013.01); *C09D 11/32* (2013.01)

(58) Field of Classification Search
CPC ....... C09D 11/30; C09D 11/32; C08F 133/08; B41M 5/502; B41M 5/508; B41M 7/0045
USPC .......................................................... 428/203
See application file for complete search history.

(56) References Cited

U.S. PATENT DOCUMENTS

| | | |
|---|---|---|
| 2006/0021535 A1 | 2/2006 | Kaiser |
| 2006/0198964 A1 | 9/2006 | Kaiser |
| 2009/0041937 A1* | 2/2009 | Leenders ................. B41M 3/14 427/256 |
| 2010/0330296 A1* | 12/2010 | Loccufier ............. C09D 11/101 427/511 |
| 2011/0152396 A1 | 6/2011 | Chretien et al. |
| 2012/0208915 A1 | 8/2012 | Hayata et al. |

FOREIGN PATENT DOCUMENTS

EP        2 138 900 A1    12/2009

OTHER PUBLICATIONS

Official Communication issued in International Patent Application No. PCT/EP2016/052773, dated Mar. 30, 2016.

* cited by examiner

*Primary Examiner* — Betelhem Shewareged
(74) *Attorney, Agent, or Firm* — Keating and Bennett, LLP

(57) ABSTRACT

A UV curable colourless inkjet liquid includes at least one radical photoinitiator and a polymerizable composition, wherein the polymerizable composition contains a mixture of: a) 25 to 50 wt % of a monofunctional methacrylate; b) 40 to 70 wt % of a polyfunctional acrylate; and c) 0 to 15 wt % of a monofunctional acrylate; with the weight percentage wt % based on the total weight of the polymerizable composition.

19 Claims, No Drawings

UV CURABLE COLOURLESS INKJET LIQUIDS

This application is a 371 National Stage Application of PCT/EP2016/052773, filed Feb. 10, 2016. This application claims the benefit of European Application No. 15160113.5, filed Mar. 20, 2015, which is incorporated by reference herein in its entirety.

BACKGROUND OF THE INVENTION

1. Field of the Invention

The present invention relates to UV curable colourless inkjet liquids and methods for applying them to a substrate, e.g. to a printed image.

2. Description of the Related Art

UV curable colourless inkjet liquids are used as a so-called inkjet varnish to modify the glossy appearance of an image. In some cases matting agents are added to the inkjet varnish to produce satin or semi-gloss sheens, for example, as illustrated US 2006021535 (HEIDELBERGER DRUCK-MASCHINEN). These matting agents are particulate substances for scattering incident light rays on the varnished surface.

However, usually inkjet varnishes are used to increase the glossiness of a printed image by eliminating any micro roughness and making the surface as even as possible. US 2006198964 (HEIDELBERGER DRUCKMASCHINEN) discloses a method using a fast flowing UV varnish to produce a smooth and highly glossy surface.

The fast flowing of an UV inkjet varnish is generally accomplished by a low viscosity and by using high amounts of surfactants. Surfactants are used because of their ability to reduce surface tension. Surface tension dictates whether a coating will wet and spread over, or retract from, a solid substrate. High amounts of surfactants may cause problems of foaming during handling of the varnish and during use in the inkjet printer. Foaming results in failing nozzles due to the presence of air bubbles in the inkjet print head.

For high curing speed, most inkjet inks and fluids are based on acrylate monomers and oligomers as they are more reactive than methacrylate monomers and oligomers. It is also common knowledge that polyfunctional (meth)acrylate monomers cure faster than monofunctional (meth)acrylate monomers. The notation (meth)acrylate monomers stands for methacrylate monomers and acrylate monomers. The type of monomer also influences the surface tension.

There is still a need for an improved UV curable colourless inkjet liquid suitable for effectively inkjet varnishing a print by controlling the gloss without any problems of foaming or jetting performance.

SUMMARY OF THE INVENTION

In order to overcome the problems described above, preferred embodiments of the present invention provide a UV curable colourless inkjet liquid as defined below.

It was surprisingly found that by making a specific mixture of monomers that a UV curable colourless inkjet liquid was obtained producing high gloss without the need of high amounts of surfactant and exhibiting still a curing speed within the range of a typical inkjet printer.

Further objects of the invention will become apparent from the description hereinafter.

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

The term "image" includes text, numbers, graphics, logos, photos, barcodes, QR codes, and the like. An image can be defined in 1 or more colours.

UV Curable Colourless Inkjet Liquids

A UV curable colourless inkjet liquid according to a preferred embodiment of the invention includes at least one radical photoinitiator and a polymerizable composition, wherein the polymerizable composition contains a mixture of: a) 25 to 50 wt % of a monofunctional methacrylate; b) 40 to 70 wt % of a polyfunctional acrylate; and c) 0 to 15 wt % of a monofunctional acrylate; with the weight percentage wt % based on the total weight of the polymerizable composition.

The term "colourless" in UV curable colourless inkjet liquid means that no colour pigment or colour dye is present in the inkjet liquid to impart colour to inkjet liquid. Colourless inkjet liquids exhibiting minor photoyellowing due to degradation products of photoinitiators after UV exposure are not excluded.

For this reason, the UV curable colourless inkjet liquid preferably includes an acylphosphine oxide photoinitiator as the at least one radical photoinitiator. The UV curable colourless inkjet liquid preferably includes no thioxanthone type photoinitiator. An advantage of these choices is that the UV curable colourless inkjet liquid after curing doesn't exhibit a yellowish colour due to degradation products of a thioxanthone type photoinitiator, while high curing speed by UV LED can be obtained.

The UV curable colourless inkjet liquid preferably has a viscosity at 45° C. and at a shear rate of 1,000 s$^{-1}$ of less than 20 mPa·s, more preferably less than 13 mPa·s.

The surface tension of the UV curable colourless inkjet liquid is preferably from 20 to 30 mN/m at 25° C., more preferably from 23 to 25 mN/m at 25° C.

The UV curable colourless inkjet liquid can be used alone, e.g. for printing a varnish on an offset or flexographic printed colour image, or it can form part of a UV curable colour inkjet ink set.

The UV curable inkjet ink set is preferably a UV curable CMYK(W) inkjet ink set. The UV curable inkjet ink set preferably includes a white inkjet ink (W).

The UV curable CMYK(W)-inkjet ink set may also be extended with extra inks such as red, green, blue, and/or orange to further enlarge the colour gamut of the image. The UV curable inkjet ink set may also be extended by the combination of full density inkjet inks with light density inkjet inks. The combination of dark and light colour inks and/or black and grey inks improves the image quality by a lowered graininess.

Monofunctional Methacrylates

The UV curable colourless inkjet liquid according to a preferred embodiment of the invention preferably includes 25 to 50 wt %, more preferably 30 to 47 wt % of a monofunctional methacrylate, with the weight percentage wt % based on the total weight of the polymerizable composition.

A monofunctional methacrylate is a polymerizable compound containing only one polymerizable group, more particularly a methacrylate group.

The monofunctional methacrylate may be one or more monomers or one or more oligomers, or a combination of them.

Suitable monofunctional methacrylates include methacrylic acid, alkylmethacrylates (linear, branched and cycloalkyl) such as methylmethacrylate, n-butylmethacrylate, tert-butylmethacrylate, cyclohexylmethacrylate, 2-ethylhexylmethacrylate, and isotridecyl methacrylate; arylmethacrylates such as benzylmethacrylate, and phenylmethacrylate; and hydroxyalkylmethacrylates such as hydroxyethylmethacrylate, and hydroxypropylmethacrylate.

Preferred monofunctional methacrylates are tetrahydrofurfuryl methacrylate, alkyl methacrylate (preferably a $C_{12}$ to $C_{15}$ alkyl methacrylate), ethoxyethoxyethylmethacrylate, 2 phenoxyethyl methacrylate, ethoxylated-4-phenyl methacrylate, ureido methacrylate, behenyl methacrylate, and 3,3,5 trimethyl cyclohexanol methoxy polyethylene glycol (350) methacrylate.

Particularly preferred monofunctional methacrylates are monofunctional methacrylates having a relatively high glass transition temperature $T_g$, preferably a $T_g$ higher than 25° C., more preferably a $T_g$ higher than 40° C. The method for determining the $T_g$ to be taken is the DSC method in ISO 11357-2:1999.

The most preferred monofunctional methacrylate include isobornyl methacrylate.

Monofunctional Acrylates

The UV curable colourless inkjet liquid according to a preferred embodiment of the invention preferably includes 0 to 15 wt %, more preferably 0 to 5 wt %, and most preferably 0 wt % of a monofunctional acrylate, with the weight percentage wt % based on the total weight of the polymerizable composition.

A monofunctional acrylate is a polymerizable compound containing only one polymerizable group, more particularly an acrylate group.

The monofunctional acrylate may be one or more monomers or one or more oligomers, or a combination of them.

Suitable monofunctional acrylates include isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate Other suitable monofunctional acrylates include caprolactone acrylate, cyclic trimethylolpropane formal acrylate, ethoxyethoxyethylmethacrylate, ethoxylated nonyl phenol acrylate, isodecyl acrylate, isooctyl acrylate, octyldecyl acrylate, alkoxylated phenol acrylate, and tridecyl acrylate.

Preferred monofunctional acrylates are tetrahydrofurfuryl methacrylate, alkyl acrylate (preferably a $C_{12}$ to $C_{15}$ alkyl acrylate), ethoxyethoxyethylacrylate, 2 phenoxyethyl acrylate, ethoxylated-4-phenyl acrylate, and 3,3,5 trimethyl cyclohexanol methoxy polyethylene glycol (350) acrylate.

Particularly preferred monofunctional acrylates are monofunctional acrylates having a relatively high glass transition temperature $T_g$, preferably a $T_g$ higher than 25° C., more preferably a $T_g$ higher than 40° C. The method for determining the $T_g$ to be taken is the DSC method in ISO 11357-2:1999.

The most preferred monofunctional acrylate is isobornyl acrylate.

Polyfunctional Acrylates

The UV curable colourless inkjet liquid according to a preferred embodiment of the invention preferably includes 40 to 70 wt %, more preferably 45 to 60 wt % of a polyfunctional acrylate, with the weight percentage wt % based on the total weight of the polymerizable composition.

A polyfunctional acrylate means that two, three or more polymerizable acrylate groups are present.

In a preferred embodiment, the polyfunctional acrylate is a duofunctional acrylate containing two polymerizable groups, namely two acrylate groups The polyfunctional acrylate may be one or more monomers or one or more oligomers, or a combination of them.

Suitable polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other higher functional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

Photoinitiators and Co-Initiators

The photoinitiator includes at least one radical photoinitiator, and preferably consists of one or more radical photoinitiators. A radical photoinitiator is a chemical compound that initiates polymerization of monomers and oligomers when exposed to actinic radiation by the formation of a free radical.

Two types of radical photoinitiators can be distinguished and used in the UV curable colourless inkjet liquid of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable colourless inkjet liquid may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpho line;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

Suitable photo-initiators are disclosed in CRIVELLO, J. V., et al. VOLUME III: Photoinitiators for Free Radical Cationic, 2nd edition. Edited by BRADLEY, G. London, UK: John Wiley and Sons Ltd, 1998. p. 287-294.

The at least one photoinitiator in the UV curable colourless inkjet liquid is preferably an acylphosphine oxide photoinitiator.

Preferred acylphosphine oxide photoinitiators include 2,4,6-trimethylbenzoyl-diphenyl-phosphine oxide available as a Darocur™ TPO (manufactured by BASF); and bis(2,4,6-trimethylbenzoyl)-phenyl phosphine oxide available as Irgacure™ 819 (manufactured by BASF).

In a preferred embodiment, the UV curable colourless inkjet liquid includes no thioxanthone type photoinitiator. UV curable colourless inkjet liquids including thioxanthone type photoinitiators generally exhibit strong photoyellowing.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable colourless inkjet liquid than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out from the outdoor billboard by e.g. acid rain.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

A preferred amount of photoinitiator is 0-50 wt %, more preferably 0.1-20 wt %, and most preferably 0.3-15 wt % of the total weight of the UV curable colourless inkjet liquid.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The UV curable colourless inkjet liquid preferably comprises the diffusion hindered co-initiator in an amount of 0.1 to 50 wt %, more preferably in an amount of 0.5 to 25 wt %, most preferably in an amount of 1 to 10 wt % of the total weight of the UV curable colourless inkjet liquid.

Polymerization Inhibitors

The UV curable colourless inkjet liquid may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

A preferred polymerization inhibitor is Irgastab™ UV10 from BASF.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the UV curable colourless inkjet liquid.

Surfactants

Surfactants may used in the UV curable colourless inkjet liquid to reduce the surface tension in order to improve the spreading of the UV curable colourless inkjet liquid. A UV curable colourless inkjet liquid must meet stringent performance criteria in order to be adequately jettable with high precision, reliability and during an extended period of time. The surface tension is not only determined by the amount and type of surfactant, but also by the polymerizable compounds and other additives in the ink composition.

The surfactant(s) can be anionic, cationic, non-ionic, or zwitter-ionic and are usually added in a total quantity less than 2 wt % based, preferably less than 1 wt % based on the total weight of the UV curable colourless inkjet liquid.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOLTN 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are preferred in the curable UV curable colourless inkjet liquids of the present invention, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

Printed Articles

A printed article according to a preferred embodiment of the invention includes the UV curable colourless inkjet liquid as defined above. Preferably such an article contains a colour image on which the UV curable colourless inkjet liquid is printed.

In a preferred embodiment, the image on the article was at least partially printed using UV curable pigmented colour inkjet inks jetted by the same inkjet printing device.

There is no real limitation on the type of substrate for inkjet printing the UV curable colourless inkjet liquid of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the printed article is selected from point-of-purchase displays, billboards, vehicle graphics, backlight signage, exhibition panels, stage graphics, construction announcements, ad panels, etc.

Inkjet Printing Devices and Methods

The UV curable colourless inkjet liquid is jetted by one or more print heads ejecting small droplets in a controlled manner through nozzles onto a substrate moving relative to the print head(s).

In a preferred embodiment, the inkjet printing device used for jetting the one or more UV curable colour inkjet inks on a substrate is also used for jetting the UV curable colourless inkjet liquid.

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

A preferred inkjet print method including the steps of:
jetting one or more UV curable colour inkjet inks on a substrate; and
jetting the UV curable colourless inkjet liquid according to the invention.

In a particularly preferred embodiment, the inkjet printing of the UV curable colourless inkjet liquid is performed in a multiple pass printing mode.

Multi-pass printing is a technique used to reduce banding in ink-jet printing. Dots of ink, when still in liquid form, tend to run together due to surface tension. This is referred to as coalescence. To print a high quality image it is important to print individual round dots. But to achieve full saturated colours, the dots must overlap to completely cover the paper. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head.

An advantage of using a multipass printing mode is that the UV curable colourless inkjet liquid is cured in a consecutive passes, rather than in a single pass which would require a curing device with a high UV output.

Curing Devices

The UV curable colourless inkjet liquid according to the present invention is cured by ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Sigma-Aldrich (Belgium) and Acros (Belgium) unless otherwise specified.

DPGDA is dipropyleneglycol diacrylate from SARTOMER.

PEA is 2-phenoxyethyl acrylate available as Sartomer™ SR339C from SARTOMER. PEA has a $T_g$ of 5° C.

15EO-TMPTA is an ethoxylated trimethylolpropane triacrylate containing fifteen ethoxy units available as Sartomer™ SR435 from SARTOMER.

IBOMA is isobornylmethacrylate available as Photomer™ 2012 from IGM Resins.

IBOA is isobornylacrylate available as Sartomer™ SR506D from SARTOMER.

HDDA is 1,6-hexanediol diacrylate available as Sartomer™ SR238 from SARTOMER.

TPO is trimethylbenzoyl diphenyl phosphine oxide supplied as Omnirad™ TPO by IGM.

KIP IT is the radical photoinitiator solution Esacure™ KIP IT containing 65% of Esacure™ KIP 150 diluted by 35% glycerol propoxylate triacrylate, as available from LAMBERTI.

CN3755 is an acrylated amine synergist available as Sartomer™ CN3755 from SARTOMER.

Surf-1 is the surfactant Tegorad™ 2200N from Surf-2 is a polyether modified polydimethylsiloxane surfactant available as BYK™ UV 3510 from BYK CHEMIE GMBH.

Stabi-1 is a mixture forming a polymerization inhibitor having a composition according to Table 1.

TABLE 1

| Component | wt % |
| --- | --- |
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

Stabi-2 is 4-hydroxy-2,2,6,6-tetramethylpiperidinooxy sebacate available as Irgastab™ UV 10 from BASF.

PET100 is a 100 μm unsubbed PET substrate with on the backside an antiblocking layer with antistatic properties available from AGFA-GEVAERT as P100C PLAIN/ABAS.

Measurement Methods

1. Viscosity

The viscosity of the UV curable compositions was measured at 45° C. and at a shear rate of 1,000 s$^{-1}$ using a Rotovisco™ RV1 viscometer from HAAKE.

2. Cure Speed

A colourless curable liquid was coated on a PET100 substrate using a bar coater and a 10 μm wired bar. The coated sample was cured using a Fusion DRSE-120 conveyer, equipped with a Fusion VPS/I600 lamp (D-bulb), by transporting the sample one or more times under the UV-lamp on a conveyer belt at a speed of 20 m/min. The maximum output of the lamp was 1.05 J/cm$^2$ and a peak intensity of 5.6 W/cm$^2$. A sample was considered as fully cured at the moment scratching with a Q-tip caused no visual damage.

Table 2 shows the maximum peak intensity (MPI) in W/cm$^2$ and the dose in J/cm$^2$ of the D-bulb for the different UV regions measured with a UV Power Puck 8651 from EIT Inc. (USA) at different settings of the lamp output for a belt speed of 20 m/min.

TABLE 2

| Lamp Output | UVC (250-260 nm) | | UVB (280-320 nm) | | UVA (320-390 nm) | | UVV (395-445 nm) | |
| --- | --- | --- | --- | --- | --- | --- | --- | --- |
| | MPI | Dose | MPI | Dose | MPI | Dose | MPI | Dose |
| 100% | 0.06 | 0.01 | 0.78 | 0.14 | 3.16 | 0.59 | 1.63 | 0.31 |
| 80% | 0.05 | 0.01 | 0.55 | 0.11 | 2.12 | 0.40 | 1.10 | 0.20 |
| 60% | 0.04 | 0.01 | 0.42 | 0.08 | 1.35 | 0.26 | 0.64 | 0.12 |
| 40% | 0.03 | 0.01 | 0.26 | 0.05 | 0.51 | 0.09 | 0.24 | 0.04 |

Taking into account the UV-lamp output used and the number of times a sample was transported under the UV-lamp, the cure speed was determined and expressed as a dose in mJ/cm$^2$.

A cure speed using a dose of at most 20,000 mJ/cm$^2$ makes economic sense.

3. Gloss

Using a Anuvia™ HDC magenta inkjet ink, a magenta print area having a surface coverage of 50% was bidirectionally printed with an Anapurna™ M2050i (from Agfa Graphics NV) at a print speed of 1.2 m/s, UV10 mode, 65% ink limitation, and at 720×720 dpi in 8 passes on a PVC substrate (Forex™ Classic 3 mm, ref. Serica: 2232 from ANTALIS).

The colourless curable liquid was bidirectionally printed at 100% surface coverage on the magenta print area using the same Anapurna™ M2050i at 1.2 m/s, UV10 mode, no ink limitation, and at 720×720 dpi in 8 passes The gloss was measured at an angle of 60° with a REFO3-D available from Dr. LANGE GmbH, Germany.

A gloss of more than 15 is desired.

4. Surface Tension

The static surface tension of the UV curable inks was measured with a KRÜSS tensiometer K9 from KRÜSS GmbH, Germany at 25° C. after 60 seconds.

Example 1

This example illustrates the advantages of a UV curable colourless inkjet liquid according to the invention.

Preparation of UV Curable Colourless Inkjet Liquids

The UV curable colourless inkjet liquids COMP-1 to COMP-5 and INV-1 to INV-3 were all prepared in the same manner by mixing ink components according to Table 3. The weight percentage (wt %) of each component is based on the total weight of the UV curable colourless inkjet liquid.

TABLE 3

| wt % of: | COMP-1 | COMP-2 | COMP-3 | COMP-4 | COMP-5 | INV-1 | INV-2 | INV-3 |
| --- | --- | --- | --- | --- | --- | --- | --- | --- |
| DPGDA | 40.50 | — | — | — | — | — | — | — |
| PEA | 27.50 | — | — | — | — | — | — | — |
| 15EO-TMPTA | 20.00 | — | — | — | — | — | — | — |
| IBOMA | — | 10.00 | — | 15.00 | 33.05 | 20.00 | 33.05 | 33.05 |
| IBOA | — | — | 33.05 | — | 20.00 | — | — | 10.00 |
| HDDA | — | 62.15 | 39.10 | 57.15 | 19.10 | 52.15 | 39.10 | 29.10 |

TABLE 3-continued

| wt % of: | COMP-1 | COMP-2 | COMP-3 | COMP-4 | COMP-5 | INV-1 | INV-2 | INV-3 |
|---|---|---|---|---|---|---|---|---|
| TPO | 4.00 | 10.00 | 10.00 | 10.00 | 10.00 | 10.00 | 10.00 | 10.00 |
| KIP IT | 6.00 | — | — | — | — | — | — | — |
| CN3755 | — | 17.00 | 17.00 | 17.00 | 17.00 | 17.00 | 17.00 | 17.00 |
| Surf-1 | 1.00 | — | — | — | — | — | — | — |
| Surf-2 | — | 0.50 | 0.50 | 0.50 | 0.50 | 0.50 | 0.50 | 0.50 |
| Stabi-1 | 1.00 | — | — | — | — | — | — | — |
| Stabi-2 | — | 0.35 | 0.35 | 0.35 | 0.35 | 0.35 | 0.35 | 0.35 |
| Viscosity (mPa·s) | 10.8 | 10.9 | 11.6 | 10.7 | 11.7 | 10.9 | 10.4 | 12.0 |

The UV curable colourless inkjet liquids COMP-1 to COMP-5 and INV-1 to INV-3 were tested for viscosity, cure speed, glossiness and surface tension. The results are shown in Tab 4. The abbreviations PA, MA and MMA used in Table 4, stand for polyfunctional acrylates, monofunctional acrylates and monofunctional methacrylates respectively.

TABLE 4

| Inkjet liquid | wt % of polymerizable composition | | | Cure Speed (mJ/cm$^2$) | Gloss | Surface Tension (MN/m) |
|---|---|---|---|---|---|---|
| | PA | MA | MMA | | | |
| COMP-1 | 68.8 | 31.3 | — | 401 | 10 | 22 |
| COMP-2 | 86.1 | — | 13.9 | 401 | 11 | 22 |
| COMP-3 | 54.2 | 45.8 | — | 1,305 | 15 | 23 |
| COMP-4 | 79.2 | — | 20.8 | 3,113 | 15 | 22 |
| COMP-5 | 26.5 | 27.7 | 45.8 | 33,844 | 47 | 25 |
| INV-1 | 72.3 | — | 27.7 | 12,151 | 17 | 23 |
| INV-2 | 54.2 | — | 45.8 | 13,959 | 18 | 25 |
| INV-3 | 40.3 | 13.9 | 45.8 | 17,575 | 20 | 24 |

From Table 4, it should be clear that only the inventive UV curable colourless inkjet liquids INV-1 to INV-3 achieved high gloss with acceptable curing speed and a surface tension of 23 mN/m or more.

The colourless inkjet liquid COMP-5 exhibited a superior gloss, but an economical unacceptable cure speed as it would result in a very low print speed or a very expensive UV curing device.

The invention claimed is:

1. A UV curable colorless inkjet liquid comprising:
   at least one radical photoinitiator; and
   a polymerizable composition including a mixture of:
      25 to 50 wt % of a monofunctional methacrylate;
      40 to 70 wt % of a polyfunctional acrylate; and
      0 to 15 wt % of a monofunctional acrylate; wherein
   the weight percentages wt % are based on a total weight of the polymerizable composition;
   the UV curable colorless inkjet liquid comprises less than 2 wt %, based on a total weight of the UV curable colorless inkjet liquid, of silicone modified acrylates, silicone modified methacrylates, acrylated siloxanes, polyether modified acrylic modified siloxanes, fluorinated acrylates, and fluorinated methacrylates; and
   the monofunctional methacrylate is selected from the group consisting of methacrylic acid, alkylmethacrylates, arylmethacrylates, hydroxyalkylmethacrylates, tetrahydrofurfuryl methacrylate, ethoxyethoxyethyl-methacrylate, 2-phenoxyethyl methacrylate, ethoxylated-4-phenyl methacrylate, ureido methacrylate, 3,3,5-trimethyl cyclohexenol methoxy polyethylene glycol (350) methacrylate, and isobornyl methacrylate.

2. The UV curable colorless inkjet liquid according to claim 1, wherein the at least one radical photoinitiator includes an acylphosphine oxide photoinitiator.

3. The UV curable colorless inkjet liquid according to claim 1, wherein the polymerizable composition includes 0 to 5 wt % of a monofunctional acrylate.

4. The UV curable colorless inkjet liquid according to claim 1, wherein the polyfunctional acrylate is a difunctional acrylate.

5. The UV curable colorless inkjet liquid according to claim 1, wherein the monofunctional methacrylate includes isobornylmethacrylate.

6. The UV curable colorless inkjet liquid according to claim 1, wherein the polymerizable composition includes a mixture of:
   30 to 47 wt % of the monofunctional methacrylate;
   45 to 60 wt % of the polyfunctional acrylate; and
   0 to 5 wt % of the monofunctional acrylate.

7. The UV curable colorless inkjet liquid according to claim 1, wherein the polymerizable composition contains no monofunctional acrylate.

8. The UV curable colorless inkjet liquid according to claim 1, wherein the UV curable colorless inkjet liquid has a viscosity at 45° C. and at a shear rate of 1,000 s$^{-1}$ of less than 13 mPa·s.

9. The UV curable colorless inkjet liquid according to claim 1, wherein the at least one radical photoinitiator includes an α-hydroxy ketone photoinitiator.

10. The UV curable colorless inkjet liquid according to claim 1, wherein the monofunctional methacrylate has a Tg larger than 25° C.

11. A printed article comprising:
   a substrate including a layer of the UV curable colorless inkjet liquid according to claim 1.

12. The printed article of claim 11, wherein the printed article includes an image printed with UV curable pigmented color inkjet inks, and the layer of the UV curable colorless inkjet liquid is applied to the image.

13. An inkjet print method comprising the steps of:
   jetting one or more UV curable color inkjet inks on a substrate; and
   jetting the UV curable colorless inkjet liquid according to claim 1 on the substrate.

14. The inkjet print method according to claim 13, wherein the step of jetting the one or more UV curable color inkjet inks is performed in a multiple pass printing mode.

15. A UV curable colorless inkjet liquid comprising:
   20.00 wt % of isobornyl methacrylate;
   52.15 wt % of 1,6-hexanediol diacrylate;
   10.00 wt % of trimethylbenzoyl diphenyl phosphine oxide;
   17.00 wt % of an acrylated amine synergist;
   0.50 wt % of a polyether modified polydimethylsiloxane surfactant; and 0.35 wt % of 4-hydroxy-2,2,6,6-tetramethylpiperidinooxy sebacate.

16. A printed article comprising:
a substrate including a layer of the UV curable colorless inkjet liquid according to claim 15.

17. The printed article of claim 16, wherein the printed article includes an image printed with UV curable pigmented color inkjet inks, and the layer of the UV curable colorless inkjet liquid is applied to the image.

18. An inkjet print method comprising the steps of:
jetting one or more UV curable color inkjet inks on a substrate; and
jetting the UV curable colorless inkjet liquid according to claim 15 on the substrate.

19. The inkjet print method according to claim 18, wherein the step of jetting the one or more UV curable color inkjet inks is performed in a multiple pass printing mode.

\* \* \* \* \*